United States Patent
Besson et al.

(10) Patent No.: US 9,476,314 B2
(45) Date of Patent: Oct. 25, 2016

(54) GAS SEAL ASSEMBLY FOR CRYOGENIC LIQUID TURBOMACHINES

(71) Applicants: Sebastien Besson, Mulhouse (FR); Bruno Brethes, Attenschwiller (FR)

(72) Inventors: Sebastien Besson, Mulhouse (FR); Bruno Brethes, Attenschwiller (FR)

(73) Assignee: Cryostar SAS (FR)

( * ) Notice: Subject to any disclaimer, the term of this patent is extended or adjusted under 35 U.S.C. 154(b) by 470 days.

(21) Appl. No.: 14/107,201

(22) Filed: Dec. 16, 2013

(65) Prior Publication Data

US 2014/0178178 A1    Jun. 26, 2014

(30) Foreign Application Priority Data

Dec. 20, 2012 (FR) .................................. 12 03520

(51) Int. Cl.
| | |
|---|---|
| *F04D 29/12* | (2006.01) |
| *F01D 11/04* | (2006.01) |
| *F16J 15/34* | (2006.01) |
| *F04D 29/10* | (2006.01) |
| *F04B 15/08* | (2006.01) |

(52) U.S. Cl.
CPC ............ *F01D 11/04* (2013.01); *F04B 15/08* (2013.01); *F04D 29/108* (2013.01); *F04D 29/128* (2013.01); *F16J 15/3404* (2013.01); *F16J 15/3412* (2013.01); *F16J 15/3452* (2013.01); *F04B 2015/081* (2013.01)

(58) Field of Classification Search
CPC .... F01D 11/003; F01D 11/04; F04D 29/108; F04D 29/128; F04B 2515/081; F04B 2515/0824; F04B 2515/0822; F04B 2515/0826; F16J 15/162; F16J 15/3404; F16J 15/3412; F16J 15/3452
See application file for complete search history.

(56) References Cited

U.S. PATENT DOCUMENTS

| | | | | |
|---|---|---|---|---|
| 2,949,321 | A * | 8/1960 | Tracy | F04D 29/128 277/391 |
| 4,212,475 | A * | 7/1980 | Sedy | F16J 15/3412 277/400 |
| 4,889,348 | A * | 12/1989 | Amundson | F04D 29/126 277/306 |
| 5,071,141 | A * | 12/1991 | Lai | F16J 15/3412 277/361 |
| 5,412,977 | A | 5/1995 | Schmohl et al. | |
| 7,144,016 | B2 | 12/2006 | Gozdawa | |
| 7,854,584 | B2 | 12/2010 | Lusted et al. | |
| 2013/0170961 | A1 | 7/2013 | Melcci et al. | |
| 2013/0195649 | A1 | 8/2013 | Kitano et al. | |

FOREIGN PATENT DOCUMENTS

| | | |
|---|---|---|
| EP | 0571791 | 12/1993 |
| WO | WO 2005/090793 A1 | 9/2005 |
| WO | WO 2008/046793 A1 | 4/2008 |
| WO | WO 2012/136496 A1 | 10/2012 |
| WO | WO 2012/136497 A1 | 10/2012 |

OTHER PUBLICATIONS

French Search Report for FR 1203520 and FA 774251, Date of Mailing: Aug. 7, 2013, Authorized Officer: Christian Regaud, 9 pp.

* cited by examiner

*Primary Examiner* — Ninh H Nguyen

(74) *Attorney, Agent, or Firm* — Joshua L. Cohen

(57) ABSTRACT

A dry seal apparatus (30) for a machine (10) includes a seal having a stationary portion (40) and a rotating portion (38); a space (44) disposed between the stationary and rotating portions; a biasing member (42) disposed proximate the stationary portion (40) and in contact therewith for applying a force to the stationary portion; and a labyrinth (37) proximate the rotating portion (38) and constructed and arranged for receiving a liquid for being vaporized before entering the space between the stationary and rotating portions of the seal. A related method is also provided.

12 Claims, 4 Drawing Sheets

GAS SEAL ASSEMBLY FOR CRYOGENIC LIQUID TURBOMACHINES

BACKGROUND

1. Field of the Invention

The present embodiments relate to dry gas seals used in cryogenic liquid turbines and cryogenic liquid pumps.

2. Background Art

Dry gas seals are used in turbomachines (turbines and compressors) for shaft sealing purposes. A dry gas seal minimizes the amount of seal gas needed to isolate the gas being expanded or compressed from internal machinery components such as bearings, the latter usually containing oil or grease. This is achieved by a pair of non-contacting rings, i.e. one ring mounted on a rotating shaft and another ring mounted on a stationary component of the turbomachine. The two rings are separated by a low clearance gap through which the seal gas flows.

This type of sealing has been used in cryogenic vertical pumps to minimize the amount of seal gas (also called buffer gas) used. The seal gas may be the process gas itself, which is vaporized from the pumped cryogenic liquid. In certain cryogenic vertical pumps, dry gas seals are located at the top of the pump shaft, this location enabling the sealing components to remain in a gaseous atmosphere. Therefore, no vaporization is needed for the fluid flowing between the seal rings. However, in cryogenic horizontal pumps where the seal is located at the suction side of the pump, the sub-cooled liquid needs to be heated to a temperature near its boiling point to vaporize between faces of the respective seals.

The use of dry gas seals in a cryogenic liquid environment, without external buffer gas, requires that the sealing fluid is vaporized when flowing through the dry gas seal. The frictional heat absorbed by the fluid when flowing between non-contacting seal faces should be large enough to vaporize the liquid and create the gas film between the seal faces. A stable gas film is indeed necessary to minimize the seal clearance and therefore minimize the gas leakage flow through the seal. Fluid cooling from heat exchange with dry gas seal components may result in the liquid remaining too cold (and too far from its boiling point) to vaporize. As a result, erratic and excessive gas flow leakage may be observed in certain horizontal pumps, where the seal is in a direct cryogenic sub-cooled liquid environment. These erratic and excessive gas flows need to be eliminated.

For example, referring to FIGS. 1 and 2, a known cryogenic horizontal pump is shown generally at 10 which includes a suction side 12 and an exhaust side 14 of a casing 15 or housing of the pump. The pump 10 is used for moving or transferring cryogenic fluid, such as a cryogenic liquid, therethrough. The cryogenic fluid can be selected from liquid natural gas (LNG), liquid nitrogen (LIN), liquid oxygen (LOX), liquid argon (LAR), liquid $CO_2$ and liquid air. At the suction side 12, a dry gas seal is provided such as that shown in FIG. 2. The dry gas seal includes a rotating ring portion 16 and a stationary ring portion 18 which coact to retain vaporized gas from the cryogenic liquid flowing through the pump 10.

Referring to FIG. 2, the sealing arrangement results in an excessive seal gas flow F, typically about 5-10 Nl/min. The excessive seal gas flow is a result of the cryogenic liquid vaporizing between the seal portions to provide the dry gas for the seal, which is problematic in that it results in an excessive amount of the dry gas leaking from the seal. The known seal arrangement includes a pump shaft 20 about which a pump inlet chamber 22 is disposed for receiving cryogenic liquid. The cryogenic liquid is usually at −196° C. and 1 barg. The stationary ring portion 18 of the seal is mounted to the seal seat 24, and the rotating ring portion 16 of the seal is mounted to the pump shaft 29. The pump inlet chamber 22 provides the cryogenic liquid from which the evaporated gas for the dry gas seal is to be provided.

What is needed however is a gas seal assembly which provides the cryogenic liquid at a pressure and a temperature as close as possible to the liquid's boiling point (vapor phase) at the inlet to the gas seal rings.

SUMMARY OF THE INVENTION

The present embodiments provide a dry seal apparatus for a machine, comprising a seal having a stationary portion and a rotating portion; a space disposed between the stationary and rotating portions; a biasing member disposed proximate the stationary portion and in contact therewith for applying a force to the stationary portion; and a labyrinth proximate the rotating portion and constructed and arranged for receiving a liquid for being vaporized before entering the space between the stationary and rotating portions of the seal.

The present embodiments provide a method of dry sealing a seal in a machine, comprising providing a stationary portion and a rotating portion spaced apart from the stationary portion; exerting a force against the stationary portion for controlling a size of a space between the stationary and rotating portions; introducing an expandable liquid into a labyrinth proximate the rotating portion for exposing said expandable liquid to a warmer temperature of the labyrinth and the rotating portion; and vaporizing the expandable liquid for providing a gas to be introduced into the space.

BRIEF DESCRIPTION OF THE DRAWINGS

For a more complete understanding of the present embodiments, reference may be had to the following description taken in conjunction with the drawing Figures, of which.

DESCRIPTION OF THE INVENTION

A dry seal apparatus for a turbomachine is provided and includes a seal having a stationary portion and a rotating portion; a space disposed between the stationary and rotating portions; a biasing member disposed proximate the stationary portion and in contact therewith for applying a force to the stationary portion; and a labyrinth proximate the rotating portion and constructed and arranged for receiving a liquid for being vaporized before entering the space between the stationary and rotating portions of the seal.

A method of dry sealing a seal in a turbomachine is provided and includes providing a stationary portion and a rotating portion spaced apart from the stationary portion; exerting a force against the stationary portion for controlling a size of a space between the stationary and rotating portions; introducing an expandable liquid into a labyrinth proximate the rotating portion for exposing said expandable liquid to a warmer temperature of the labyrinth and the rotating portion; and vaporizing the expandable liquid for providing a gas to be introduced into the space.

Figure 1:
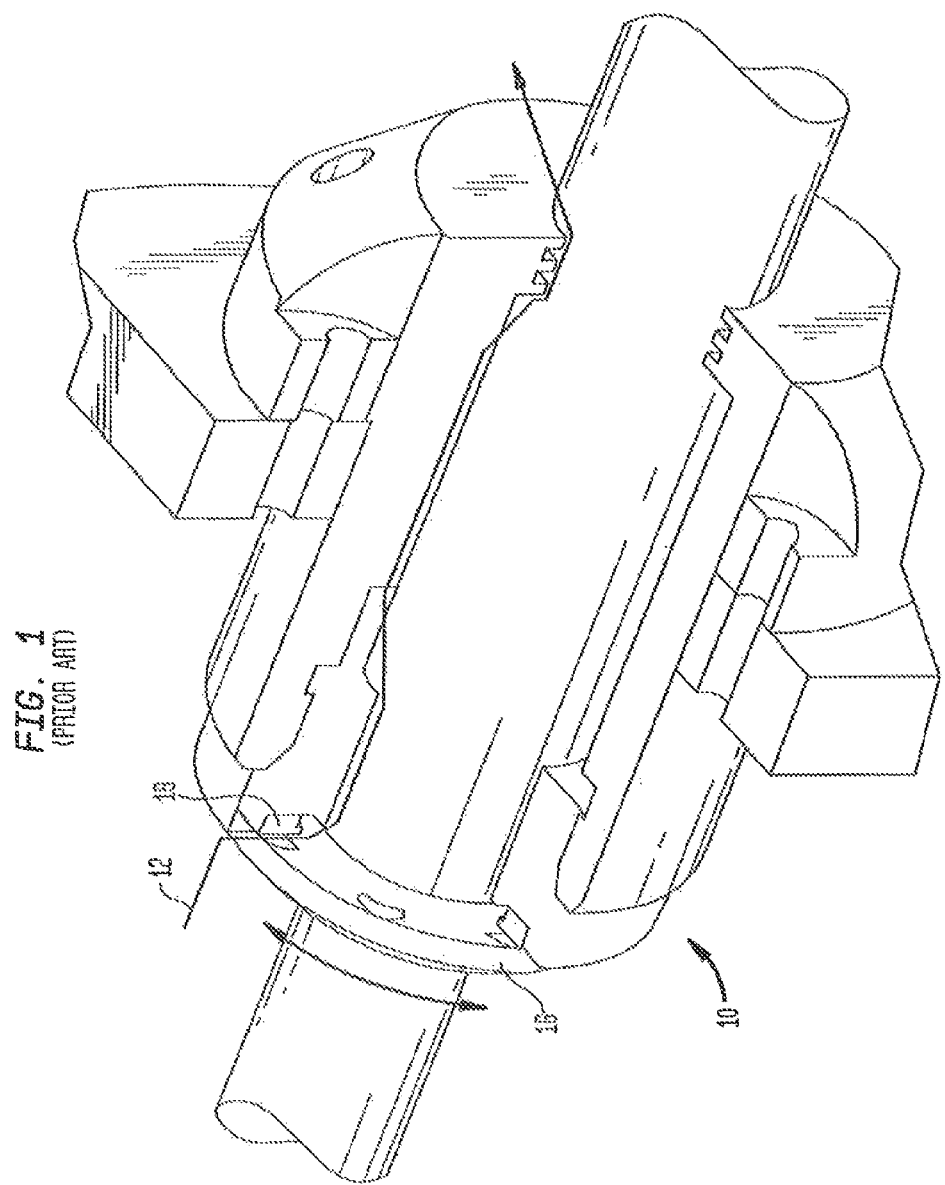
FIG. 1 shows a top perspective view of a known cryogenic horizontal pump in which a gas seal apparatus can be used.
Figure 2:
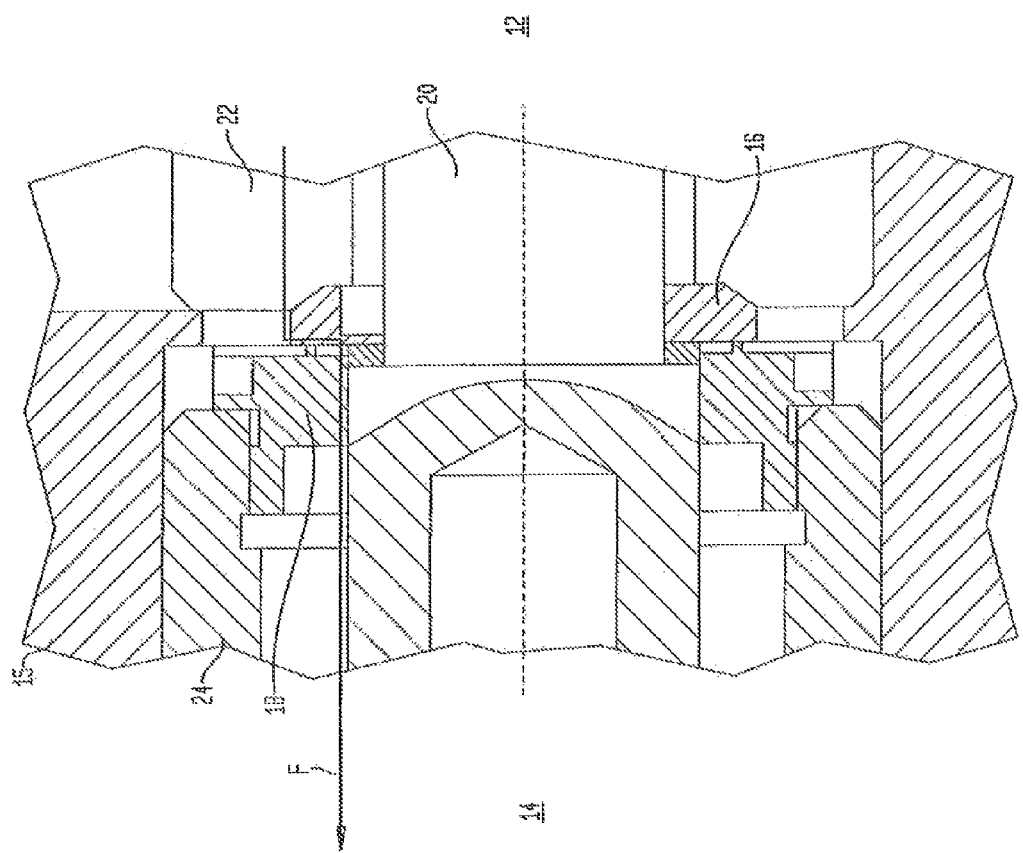
FIG. 2 shows a cross-sectional side view of a known gas seal apparatus for the pump of FIG. 1.
Figure 3:
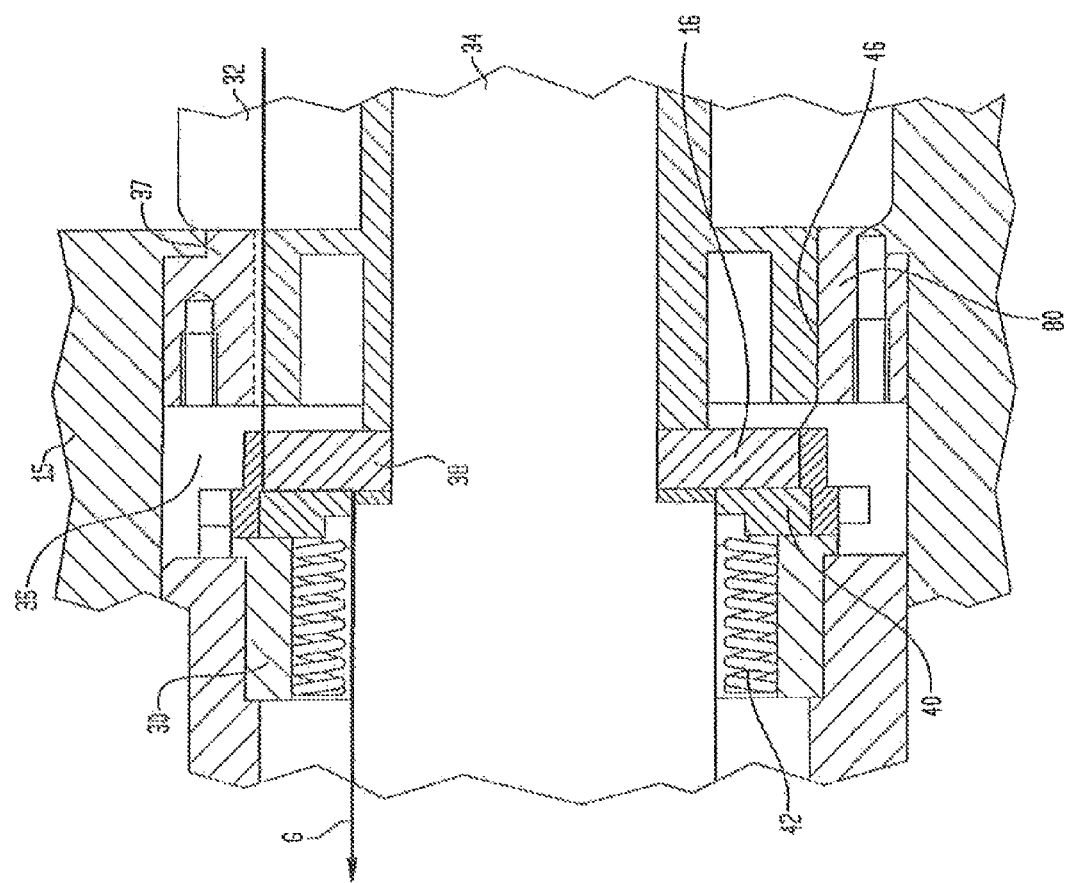
FIG. 3 shows a cross-sectional side view of a gas seal apparatus embodiment of the present invention which can be used in the pump of FIG. 1.
Figure 4:
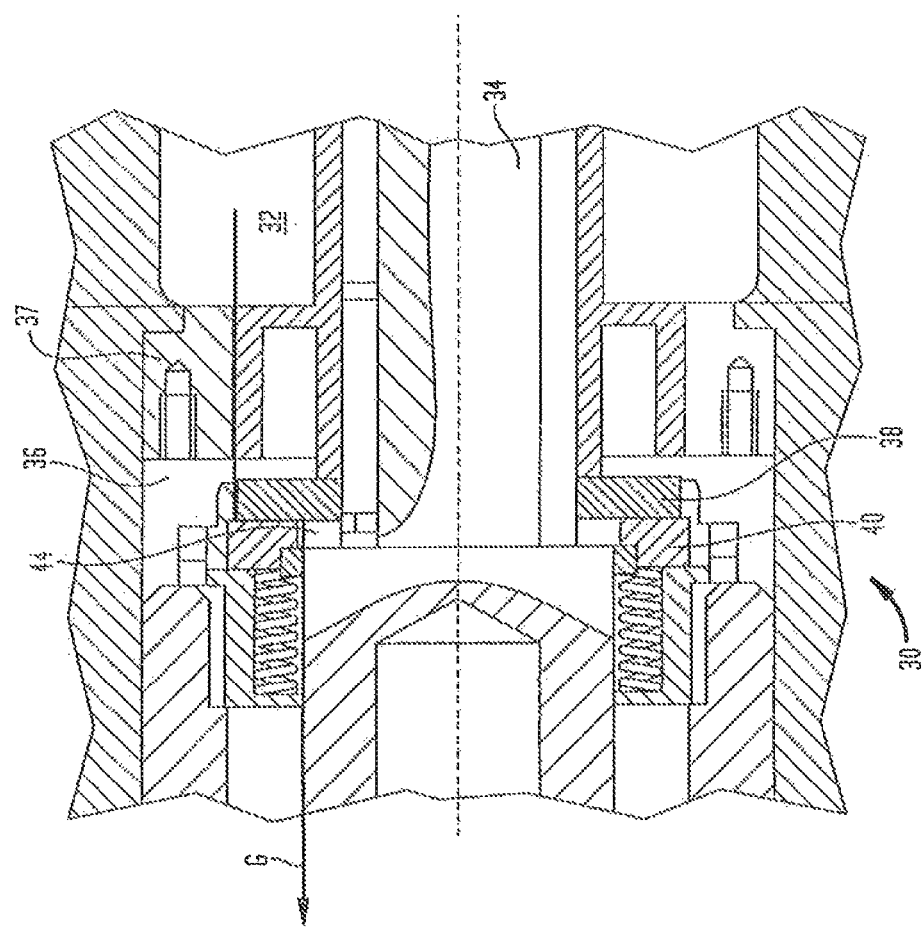
FIG. 4 shows an enlarged cross-sectional side view of the gas seal apparatus embodiment of FIG. 3.

Referring to FIGS. 3 and 4, a gas seal apparatus of the present embodiments is shown generally at 30 for use in a turbomachine 10 for cryogenic liquid. The turbomachine 10 can be for example a cryogenic liquid turbine, or a rotating machine 10 such as a cryogenic liquid pump. LNG or liquid nitrogen (LIN) for example may be acted on by the apparatus 30. The apparatus 30 includes a shaft sealing arrangement which reduces a gas flow "G" at the seal. This is achieved by biasing or forcing gas seal cartridge elements 38, 40, 42 (further discussed below) away from a pump inlet chamber and including an intermediate portion with a labyrinth acting as a vaporizer. As the cryogenic fluid moves to the ring portions 38, 40 of the seal, the cryogenic fluid flows through a cavity or labyrinth 36 where its respective enthalpy is reduced. In addition, positioning of the seal gas cartridge increases the temperature of the dry gas seal components, thereby making them warmer, than occurs in the known sealing arrangement of FIG. 2. Both the narrow passage through the cavity 36 and the seal gas cartridge re-location to the warmer area of the machine, result in vaporization of the cryogenic liquid prior to its flow between the ring portions 38,40 of the seal. In other words, the present embodiment provides for a cryogenic gas flow G to reach the seal rings, not the cryogenic liquid seal gas flow "F" which occurs in the known seal arrangement of FIGS. 1-2. Therefore, with the embodiment of the apparatus 30 of the present invention, a stable gas film is established between the seal ring portions 38, 40 which reduces and stabilizes any seal gas leakage.

More particularly and still referring to FIGS. 3 and 4, the gas seal apparatus 30 includes a pump inlet chamber 32 or suction pump area through which a pump shaft 34 is disposed. Cryogenic liquid is present in the pump inlet chamber 32. The cavity 36 of a labyrinth ring 37 extends axially about the pump shaft 34 and is separate from but in communication with the pump inlet chamber 32. A dry seal includes a rotating portion 38 and a stationary portion 40, between which a pressure of the liquid cryogen decreases and the liquid expands which results in an increase in temperature of the cryogenic liquid. However, the cryogenic liquid is still in liquid phase in the cavity 36, as it is in the pump inlet chamber 32. The rotating and stationary portions 38, 40 of the dry seal can be constructed as rings which axially extend around the pump shaft 34.

A biasing member 42 such as for example a spring is mounted to the dry gas seal housing. The spring 42 may be pre-loaded, i.e. the spring provides a predetermined amount of pressure or force against the stationary ring portion 40 of the dry seal. The force exerted by the spring 42 on the stationary ring portion 40 of the dry seal controls a size and therefore volume of a space 44 between the rotating and stationary ring portions 38, 40.

The cryogenic liquid is therefore permitted to flow from the pump inlet chamber 32 into the cavity 36 after which it beings to vaporize so that only cryogenic gas is provided to the space 44. A path or passageway 46 for the flow of the cryogenic liquid to become the cryogenic gas for the space 44 is shown at FIG. 3 (labyrinth path). In effect, the liquid cryogen is vaporized before it enters the space 44, which is different from the known apparatus which permits the cryogenic liquid to flow through the space from which the cryogenic gas is produced.

The spring 42 not only controls the size of the space 44, but provides a counter-force to the expanding cryogenic gas in the space between the rotating and stationary ring portions 38, 40. In effect, the spring 42 maintains equilibrium so that the space 44 maintains a continuous volume for the amount of cryogenic vapor that results from the cryogenic liquid entering from the pump inlet chamber 32 into the cavity 36.

The cryogenic liquid located in the pump inlet chamber 32 flows through the labyrinth path 46 between the labyrinth ring 37 and rotating ring portion 38 and enters the cavity 36 in front of the seal apparatus 38,40 at a lower pressure and close to its boiling point (vapor phase). Partial vapor is therefore present so that when the remaining liquid cryogen enters the space 44, it is immediately vaporized by the friction effect between the portion 38 rotating against the portion 40. The small space 44 permits only a very low leakage of cryogen gas to the exhaust side 14.

The apparatus 30 of the present embodiments efficiently uses dry gas seals and cryogenic pumps without using external buffer gas. The shaft 34 of the apparatus 30 heats the cryogenic liquid to its boiling point (vapor phase) before it reaches the seal rings 38, 40 so that only the gas is introduced between the seal rings. This obviates the need for external buffer gas.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A turbomachine for cryogenic liquid having a dry seal apparatus, comprising:
    a seal having a stationary portion (40) and a rotating portion (38);
    a space (44) disposed between the stationary and rotating portions;
    a biasing member (42) disposed proximate the stationary portion (40) and in contact therewith for applying a force to the stationary portion (40); and
    a labyrinth ring (37) comprising a cavity axially extended about a pump shaft (34) proximate the rotating portion (38) and constructed and arranged for receiving a liquid for being vaporized before entering the space (44) between the stationary and rotating portions of the seal.

2. The turbomachine of claim 1, wherein the rotating portion (38) is upstream of the stationary portion (40).

3. The turbomachine of claim 1, wherein the biasing member (42) comprises a spring.

4. The turbomachine of claim 1, further comprising an inlet chamber (22) for the machine, the inlet chamber disposed upstream of and in communication with the labyrinth ring (37) for receiving the liquid.

5. The turbomachine of claim 4, further comprising a pathway for the communication between the inlet chamber and the seal.

6. The turbomachine of claim 1, wherein the machine is selected from the group consisting of a pump and a turbine.

7. The turbomachine of claim 6, wherein the machine comprises a pump and the apparatus is disposed at the pump shaft (34) of the pump.

8. A method of dry sealing a seal in a turbomachine for a cryogenic liquid, comprising:
    providing a stationary portion (40) and a rotating portion (38) spaced apart from the stationary portion;
    exerting a force against the stationary portion (40) for controlling a size of a space (44) between the stationary and rotating portions;
    introducing an expandable liquid into a cavity (36) of a labyrinth ring (37) axially extended about a pump shaft (34) proximate the rotating portion (38) for exposing said expandable liquid to a warmer temperature of the labyrinth ring and the rotating portion (38); and vaporizing the expandable liquid for providing a gas to be introduced into the space.

9. The method of claim 8, further comprising positioning the rotating portion (38) upstream of the stationary portion (40).

10. The method of claim 8, further comprising flowing the gas from the labyrinth ring (37) into the space (44) between the stationary and rotating portions (40,38).

11. The method of claim 8, wherein the expandable liquid is selected from the group consisting of liquid natural gas (LNG), liquid nitrogen (LIN), liquid oxygen (LOX), liquid argon (LAR), liquid $CO_2$ and liquid air.

12. The method of claim 8, wherein the machine is selected from the group consisting of a pump, and a turbine.

* * * * *